US009246219B2

(12) United States Patent
Wu

(10) Patent No.: US 9,246,219 B2
(45) Date of Patent: Jan. 26, 2016

(54) HANDHELD DEVICE

(75) Inventor: Wei-Yang Wu, Taoyuan County (TW)

(73) Assignee: HTC CORPORATION (TW)

( * ) Notice: Subject to any disclaimer, the term of this patent is extended or adjusted under 35 U.S.C. 154(b) by 278 days.

(21) Appl. No.: 13/177,682

(22) Filed: Jul. 7, 2011

(65) Prior Publication Data
US 2013/0009826 A1 Jan. 10, 2013

(51) Int. Cl.
H01Q 1/24 (2006.01)
H04B 5/00 (2006.01)
H01Q 7/00 (2006.01)

(52) U.S. Cl.
CPC ............... H01Q 7/00 (2013.01); H01Q 1/243 (2013.01); H04B 5/0025 (2013.01)

(58) Field of Classification Search
CPC .................................................. H04B 5/0025
USPC ........................................................ 343/866
See application file for complete search history.

(56) References Cited

U.S. PATENT DOCUMENTS

| 7,482,983 | B2 * | 1/2009 | Chang et al. | 343/702 |
| 8,665,159 | B2 | 3/2014 | Kuo et al. | |
| 2009/0002242 | A1 * | 1/2009 | Lasarov et al. | 343/702 |
| 2009/0051602 | A1 * | 2/2009 | Jeon et al. | 343/700 R |
| 2009/0160712 | A1 * | 6/2009 | Breiter et al. | 343/702 |
| 2010/0194334 | A1 * | 8/2010 | Kirby et al. | 320/108 |
| 2010/0201582 | A1 * | 8/2010 | Nam et al. | 343/702 |
| 2010/0271265 | A1 | 10/2010 | Sung et al. | |
| 2010/0271270 | A1 | 10/2010 | Sung et al. | |
| 2010/0271272 | A1 | 10/2010 | Sung et al. | |
| 2010/0271283 | A1 | 10/2010 | Sung et al. | |
| 2011/0032153 | A1 | 2/2011 | Hong et al. | |

FOREIGN PATENT DOCUMENTS

| CN | 101431175 A | 5/2009 |
| CN | 201467222 U | 5/2010 |
| DE | 102008038301 A1 | 4/2009 |
| DE | 102009046936 A1 | 11/2010 |
| DE | 102009055289 A1 | 11/2010 |
| DE | 102009055359 A1 | 11/2010 |
| DE | 102009055361 A1 | 11/2010 |

(Continued)

OTHER PUBLICATIONS

Adelya et al.; "Near field communication"; http://en.wikipedia.org/w/index.php?oldid=437603841; 18 pages.

(Continued)

Primary Examiner — Hoang V Nguyen
Assistant Examiner — Michael Bouizza
(74) Attorney, Agent, or Firm — Cantor Colburn LLP

(57) ABSTRACT

A handheld device is provided. The handheld device comprises a housing, a covering means, a circuit board, a battery and a near-field communication (NFC) antenna. The covering means is assembled with the housing to form a receiving space. The covering means comprises an outer surface and a through hole. The circuit board and the battery are disposed in the receiving space and electrically connected to each other. The NFC antenna comprises a metal layer and a transmission element. The metal layer is patterned on the outer surface of the covering means. The transmission element electrically couples the metal layer to the circuit board via the through hole. The NFC antenna is separated from the battery and the circuit board with a distance by the covering means.

12 Claims, 3 Drawing Sheets

(56) References Cited

FOREIGN PATENT DOCUMENTS

DE    102009055204 A1    2/2011
TW       201114102 A1    4/2011

OTHER PUBLICATIONS

"New Gadget Handphone Laptop" Dec. 7, 2010; http://technovisione.blogspot.de/2010/12/honevcomb-r . . . (accessed Dec. 12, 2012); 6 pages.
Topolsky, Joshua "Nexus S review" posted Dec. 10, 2010; http://www.engadget.com/2010/12/10/nexus-s-review/; 14 pages.
Gonzalez, Gustavo D.; "NFC antenna and chip in Nexus S"; Posted Jan. 5, 2011; Gibraltar Software Factory; http://gibraltarsf.com/blog/?p=17; 5 pages.
"Nokia 6131 NFC phone taps into mobile payment, ticketing and local sharing" Published Jan. 8, 2007 by Nokia-Press Release; 4 pages.
"Nokia 6131 NFC User Guide" 2007, Issue 2/9254007; 116 pages.
Request for Examination, legally made on Dec. 9, 2011; German Patent and Trademark Office dated Jan. 18, 2013; File No. 102011056203.6; 6 pages.
AreaMobile Redaktion, "RFID—Technologie fur die Serienproduktion", Aug. 1, 2007; 2 pages (See corresponding Nokia 6131 NFC User Guide).
Chinese Office Action corresponding to Application No. 201110321523.2; Mailing date: Sep. 3, 2014, no English translation available.
Taiwan Office Action corresponding to Application No. 10321307870; Mailing date: Sep. 22, 2014, no English translation available.

\* cited by examiner

HANDHELD DEVICE

REPRESENTATIVE FIGURE (i) Representative Figure: FIG. 2
(ii) Brief description of reference numerals of the representative figure:
3: handheld device
31: housing
33: covering means
35: circuit board
37: NFC antenna
39: battery
41: receiving space
331: outer surface
371: metal layer
373: transmission element

CHEMICAL FORMULA BEST CHARACTERIZING THE INVENTION

None

DESCRIPTION OF THE INVENTION

1. Field of the Invention

The present invention relates to a handheld device. More particularly, the handheld device of the present invention has a near-field communication (NFC) antenna disposed on an outer surface of a back cover or a battery cover of the handheld device, and this eliminates the need of a ferrite sheet which is conventionally used to separate the NFC antenna from electronic components inside the handheld device to avoid mutual interference.

2. Descriptions of the Related Art

With rapid development of the communication industry, more and more wireless communication technologies are incorporated in handheld devices. Currently, common handheld devices usually support communication in 2G and 3G wireless communication systems, i.e., the Global System for Mobile Communication (GSM) and the Universal Mobile Telecommunications System (UMTS). In addition to the 2G and 3G wireless communication systems, many smart mobile phones further support packet transmission in wireless LANs (WLANs) and 3GPP Long Term Evolution (3GPP LTE) systems, and even further support the near-field communication (NFC) technology for non-contact point-to-point data transmission within a short distance.

As shown in FIG. 1, a conventional handheld device 1 at least comprises a housing 11, a back cover 13, a circuit board 15, an NFC antenna 17, a ferrite sheet 19, and a battery 21. The NFC antenna 17 is disposed on an inner surface 131 of the back cover 13 and electrically connected to the circuit board 15 via a transmission element 171. The transmission element 171 may be a pogo pin, a coaxial cable, or any other conductive element capable of transmitting a signal. In order to cater for the tendency towards a light weight and a thin profile of the handheld device, the spacing between the NFC antenna 17 and the circuit board 15 and the battery 21 has to be reduced significantly. In this case, the handheld device 1 must be additionally provided with the ferrite sheet 19 between the NFC antenna 17 and the circuit board 15 and the battery 21 to reduce the interference with the NFC antenna 17 caused by electronic elements of the circuit board 15 and the battery 21. However, the ferrite sheet 19 adds to the cost of the handheld device 1, and imposes a limitation on disposition of the NFC antenna 17.

In view of this, an urgent need exists in the art to provide a solution capable of eliminating the need of the ferrite sheet of the handheld device and flexibly disposing the NFC antenna on the handheld device.

CONTENTS OF THE INVENTION

An objective of the subject application is to provide a handheld device, which has a near-field communication (NFC) antenna disposed on an outer surface of a back cover, a battery cover, or a housing of the handheld device. Thus, there is no need to dispose a ferrite sheet between the NFC antenna and a circuit board and a battery in the handheld device of the subject application. Therefore, the manufacturing cost of the handheld device is reduced, and the NFC antenna can be disposed more flexibly.

To achieve the aforesaid objective, the subject application discloses a handheld device, which comprises a housing, a covering means, a circuit board, a battery, and an NFC antenna. The covering means is assembled with the housing to form a receiving space and has an outer surface and a through hole. The circuit board is disposed in the receiving space. The battery is disposed in the receiving space and electrically connected to the circuit board. The NFC antenna comprises a metal layer and a transmission element. The metal layer is patterned on the outer surface of the covering means. The transmission element electrically couples the metal layer to the circuit board via the through hole. The NFC antenna is separated from the battery and the circuit board with a distance by the covering means.

The detailed technology and preferred embodiments implemented for the subject application are described in the following paragraphs accompanying the appended drawings for people skilled in this field to well appreciate the features of the claimed invention.

DESCRIPTION OF THE PREFERRED EMBODIMENT

The present invention mainly relates to a handheld device. The handheld device has a near-field communication (NFC) antenna disposed on an outer surface of a covering means of the handheld device, and the covering means comprises a back cover, a battery cover, or a part of a housing of the handheld device; thereby, the need of a ferrite sheet is eliminated. It shall be appreciated that, description of the following embodiments is only for purpose of illustration rather than to limit the present invention. Further, in the following embodiments and the attached drawings, elements unrelated to the present invention are omitted from depiction; and dimensional relationships among individual elements in the attached drawings are illustrated only for ease of understanding but not to limit the actual scale.

FIG. 2 depicts a handheld device 3 according to a first embodiment of the present invention. The handheld device 3 may be a mobile phone, a personal digital assistant (PDA), a tablet computer, a global positioning system (GPS) device, or some other portable devices. The handheld device 3 comprises a housing 31, a covering means 33, a circuit board 35, an NFC antenna 37 and a battery 39. It shall be noted that, for the purpose of simplicity, other elements of the handheld device 3, such as a display module, a communication module, an input module and elements less related to the present invention, are all omitted from depiction herein.

The housing 31 is assembled with the covering means 33 to form a receiving space 41. The covering means 33 has an outer surface 331 and a through hole (i.e., a portion through which a transmission element 373 passes). The circuit board 35 and the battery 39 are disposed in the receiving space 41 and electrically connected to each other. The battery 39 serves as a working power supply for the handheld device 3 to operate. The NFC antenna 37 comprises a metal layer 371 and a transmission element 373. The metal layer 371 is patterned as a radiator on the outer surface 331 of the covering means 33 to form a resonant current path and to cause electromagnetic radiation. The transmission element 373 electrically couples the metal layer 371 to the circuit board 35 via the through hole so as to transmit a signal induced by the NFC antenna 37 to the circuit board 35, or receive from the circuit board a signal to be transmitted. In another design, the housing 31 of the handheld device 3 extensionally forms a receiving space 41, and has a covering means at a side of the housing opposite to the location of the display module. This covering means may also have an outer surface 331 and a through hole, and the metal layer 371 is patterned as a radiator on the outer surface 331 of the covering means. In other words, the housing at this side exactly corresponds to the position of the original back cover or battery cover 33. The housing covers at least some of elements or modules inside the handheld device 3.

As shown in FIG. 2, the metal layer 371 of the NFC antenna 37 is formed on the outer surface 331 of the covering means 33 and, consequently, is separated from the battery 39 and the circuit board 35 with a distance by the covering means 33. In this way, the interference to the NFC antenna 37 caused by electronic elements of the circuit board 35 and the battery 39 can be reduced. Thus, the subject application can eliminate the need of a ferrite sheet in the handheld device 3 to reduce the manufacturing cost of the handheld device 3. Furthermore, forming the metal layer 371 of the NFC antenna 37 on the outer surface 331 allows the antenna to be designed flexibly to make full use of the entire outer surface 331, and the outer surface 331 may be a smooth surface or any three-dimensional surface.

Further speaking, the metal layer 371 may be patterned on the outer surface 331 through a process such as a double plastic injection process or a laser direct structuring (LDS) process; however, the subject application is not limited to the two processes, and any other processes capable of patterning the metal layer 371 on the outer surface 331 are all covered within the scope of the subject application. As used in this embodiment, "patterning" refers to forming a metal layer 371 of a particular pattern on the outer surface 331, and the particular pattern generally refers to a profile that allows the NFC antenna 37 to transmit/receive signals. In other words, conventional NFC antenna profiles and any other profiles designed on the basis of the conventional NFC antenna profiles are all covered within the scope of the subject application.

FIG. 3 depicts an example of the handheld device 3 of the subject application. The metal layer 371 of the NFC antenna 37 is patterned with a loop type (comprising multiple loops) on the outer surface 331 of the covering means 33. In this example, the metal layer 371 has a first end point 371a and a second end point 371b; the through hole of the covering means 33 comprises a first through hole (at a location corresponding to the first end point 371a) and a second through hole (at a location corresponding to the second end point 371b); and the transmission element 373 consists of a first transmission element (not shown) and a second transmission element (not shown). In a practical design of the antenna, the first transmission element may electrically couple the first end point 371a of the metal layer 371 to a feeding point of the circuit board 35, and the second transmission element may also electrically couple the second end point 371b of the metal layer 371 to the feeding point of the circuit board 35.

Furthermore, in another practical design of the antenna, the first transmission element may electrically couple the first end point 371a of the metal layer 371 to a feeding point of the circuit board 35, and the second transmission element may electrically couple the second end point 371b of the metal layer 371 to a ground point of the circuit board. In a similar design, the first transmission element may electrically couple the first end point 371a of the metal layer 371 to the ground point of the circuit board 35, and the second transmission element may electrically couple the second end point 371b of the metal layer 371 to the feeding point of the circuit board.

According to the above descriptions, the handheld device of the subject application has the NFC antenna formed on the outer surface of the back cover, the battery cover or the housing of the handheld device. This increases the distance between the NFC antenna and the battery and the circuit board and reduces the interference to the NFC antenna caused by the electronic elements of the circuit board and the battery, so the need of the ferrite sheet of the handheld device is eliminated. Furthermore, as the design of the handheld device of the subject application can make full use of the whole area of the outer surface of the back cover, the battery cover, or the housing of the handheld device, the antenna can be designed flexibly and the performance of the antenna can be improved appropriately.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

BRIEF DESCRIPTION OF REFERENCE NUMERALS

Figure 1:
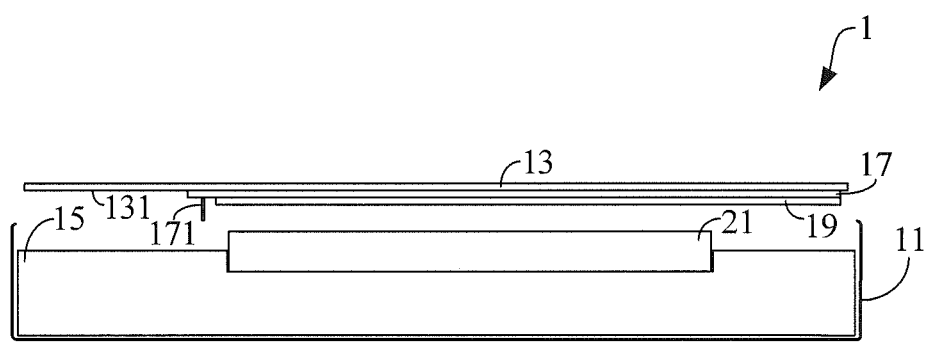
FIG. 1 is a schematic view of a conventional handheld device 1.
Figure 2:
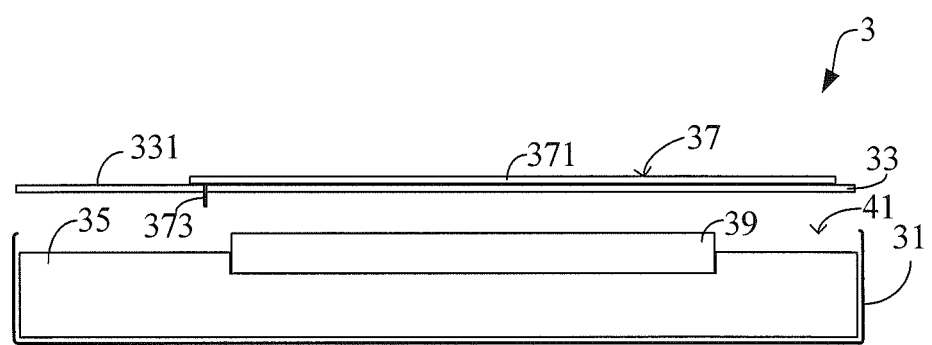
FIG. 2 is a schematic view of a handheld device 3 of the present invention.
Figure 3:
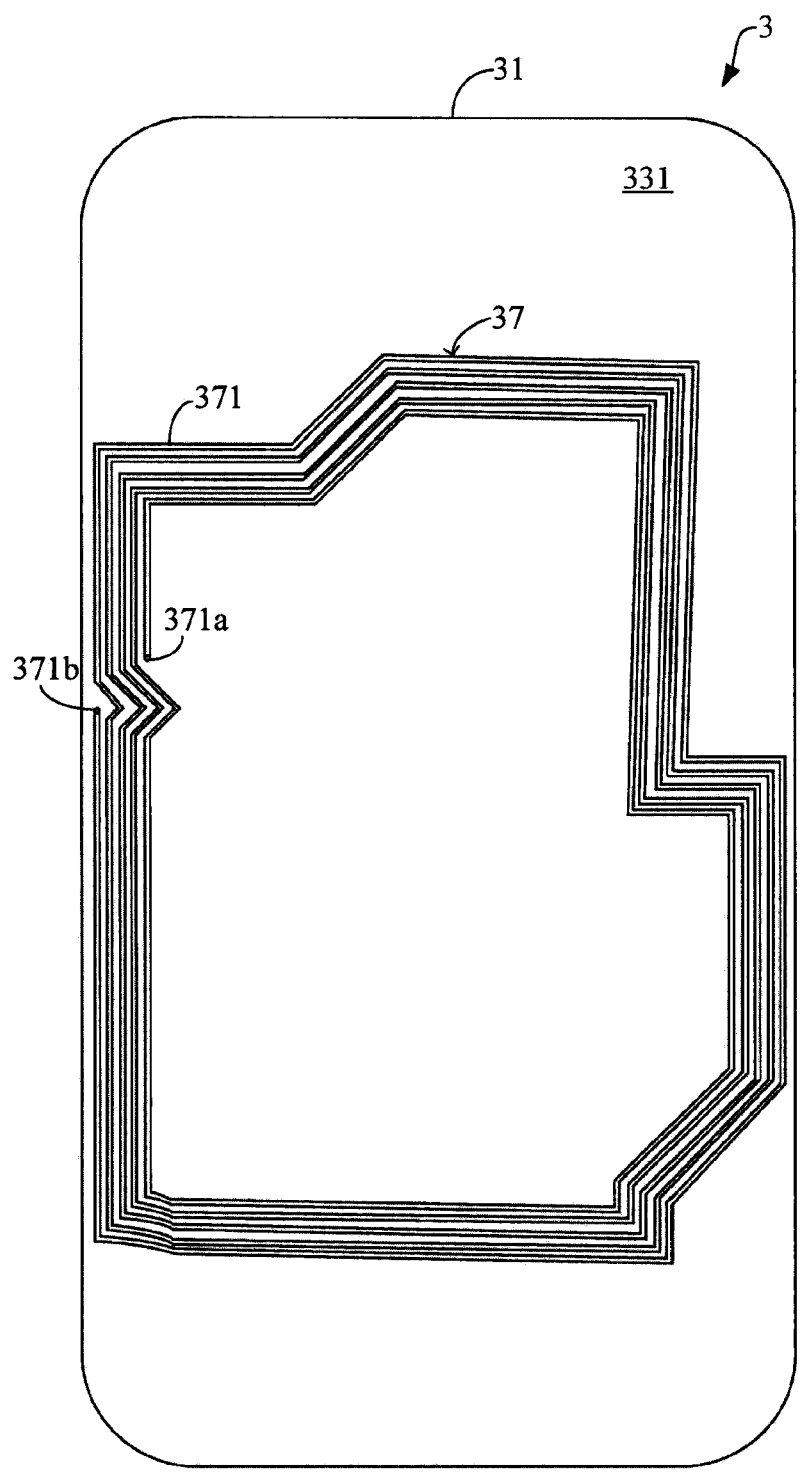
FIG. 3 depicts an example in which an NFC antenna of the present invention is formed on an outer surface of a back cover.

1: handheld device
11: housing
13: covering means
15: circuit board
17: NFC antenna
19: ferrite sheet
21: battery
131: inner surface
171: transmission element
3: handheld device
31: housing
33: covering means
35: circuit board
37: NFC antenna
39: battery
41: receiving space
331: outer surface 371: metal layer
371a: first end point
371b: second end point
373: transmission element

The invention claimed is:

1. A handheld device comprising:
 a housing;
 a cover, being assembled with the housing to form a receiving space and having an outermost surface and a through hole, the outermost surface being a surface of the cover furthest away from the receiving space in a direction perpendicular to the surface;
 a circuit board, being disposed in the receiving space;
 a battery, being disposed in the receiving space and electrically connected to the circuit board; and
 a near-field communication (NFC) loop antenna comprising:
  a metal layer, being patterned directly on the outermost surface of the cover, the metal layer being opposite to the battery and the circuit board in relative to the cover and a most part of the metal layer overlapping the battery; and
  a transmission element electrically coupling the metal layer to the circuit board via the through hole,
 wherein the NFC antenna is separated from the battery and the circuit board with a distance by the cover.

2. The handheld device as claimed in claim 1, wherein the metal layer comprises a first end point and a second end point, the through hole comprises a first through hole and a second through hole, and the transmission element comprises a first transmission element and a second transmission element.

3. The handheld device as claimed in claim 2, wherein the first transmission element couples the first end point of the metal layer to a first feeding point of the circuit board, and the second transmission element couples the second end point of the metal layer to a second feeding point of the circuit board.

4. The handheld device as claimed in claim 2, wherein the first transmission element couples the first end point of the metal layer to a feeding point of the circuit board, and the second transmission element couples the second end point of the metal layer to a ground point of the circuit board.

5. The handheld device as claimed in claim 1, wherein the handheld device is one of a mobile phone, a personal digital assistant (PDA), a tablet computer, and a global positioning system (GPS) device.

6. The handheld device as claimed in claim 1, wherein the metal layer is patterned on the outermost surface through a double plastic injection process.

7. The handheld device as claimed in claim 1, wherein the metal layer is patterned on the outermost surface through a laser direct structuring (LDS) process.

8. A handheld device comprising:
 a housing extensionally forming a receiving space, wherein a part of the housing forms a cover and the cover has an outermost surface, and a through hole, the outermost surface being a surface of the cover furthest away from the receiving space in a direction perpendicular to the surface;
 a circuit board, being disposed in the receiving space;
 a battery, being disposed in the receiving space and electrically connected to the circuit board; and
 an NFC loop antenna comprising:
  a metal layer, being patterned directly on the outermost surface of the cover, the metal layer being opposite to the battery and the circuit board in relative to the cover and a most part of the metal layer overlapping the battery; and
  a transmission element electrically coupling the metal layer to the circuit board via the through hole,
 wherein the NFC antenna is separated from the battery and the circuit board with a distance by the cover.

9. The handheld device as claimed in claim 8, wherein the metal layer comprises a first end point and a second end point, the through hole comprises a first through hole and a second through hole, and the transmission element comprises a first transmission element and a second transmission element.

10. The handheld device as claimed in claim 8, wherein the handheld device is one of a mobile phone, a personal digital assistant (PDA), a tablet computer, and a global positioning system (GPS) device.

11. The handheld device as claimed in claim 8, wherein the metal layer is patterned on the outermost surface through a double plastic injection process.

12. The handheld device as claimed in claim 8, wherein the metal layer is patterned on the outermost surface through a laser direct structuring (LDS) process.

* * * * *